Oct. 18, 1966 K. JANISZEWSKI 3,279,870
PLATEN MOUNTING OF DIE SET LEADER PINS AND BUSHINGS
Filed July 30, 1963
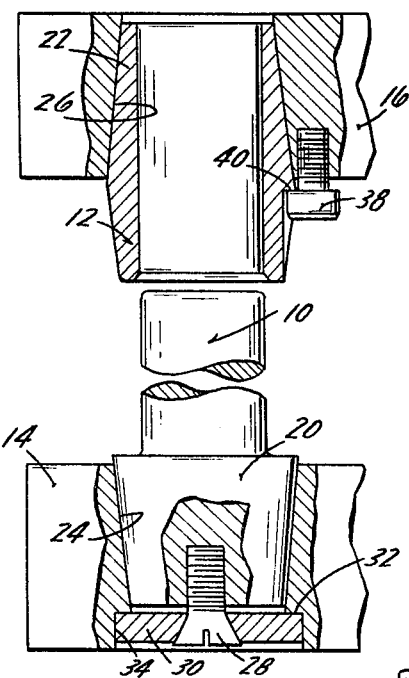
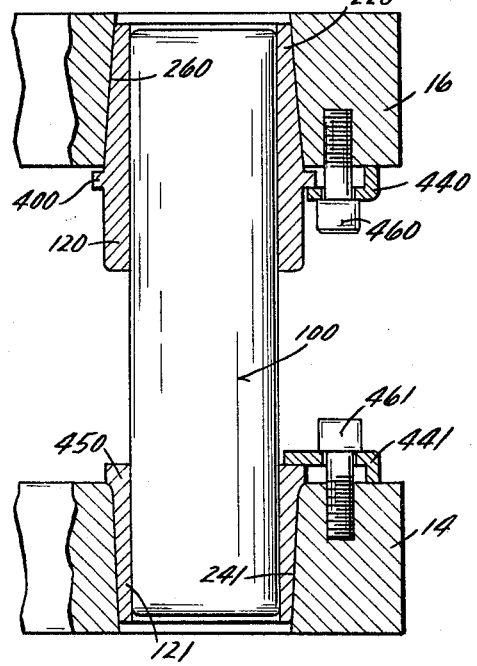
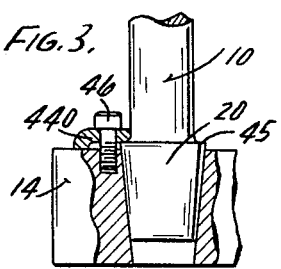
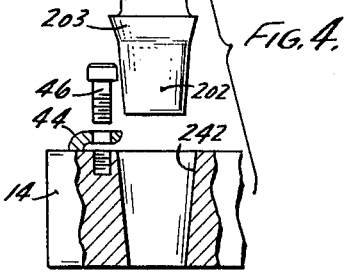
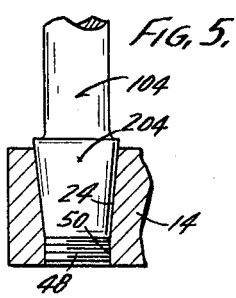
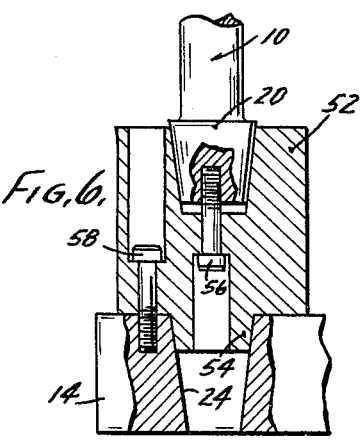
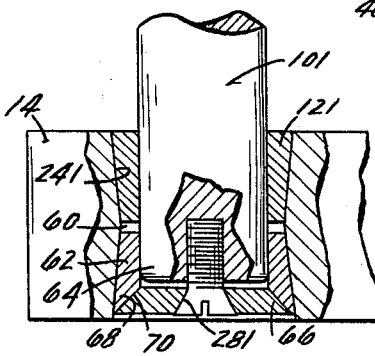
INVENTOR.
KASIMIR JANISZEWSKI
BY
Wheeler, Wheeler & Wheeler
ATTORNEYS.

United States Patent Office 3,279,870
Patented Oct. 18, 1966

3,279,870
PLATEN MOUNTING OF DIE SET LEADER
PINS AND BUSHINGS
Kasimir Janiszewski, 5426 Andover Road,
Milwaukee, Wis.
Filed July 30, 1963, Ser. No. 298,618
8 Claims. (Cl. 308—4)

This invention relates to the mounting of die set leader pins and bushings. The present application is a continuation-in-part of application Serial No. 186,102, filed April 9, 1962, now Patent No. 3,176,378 issued April 6, 1965. The present application contains claims divided from the parent application above identified.

The leader pin of a die set, and the bushing or bushings with which it cooperates must be exactly normal to the platen. This involves a number of related problems, some of which concern setting them correctly in the first place and some of which concern maintaining a precision setting.

Die sets are ordinarily assembly completely by the die set manufacturer despite the fact that the completed die set requires a relatively large package for shipment and is peculiarly subject to damage in shipment. The reason for complete assembly by the manufacture is because conventional manufacturing methods require special tools and techniques for assembling the leader pin and few die set customers have the requisite tools or experience. By reason of the invention here disclosed, the die set can be shipped disassembled in a compact package and can be assembled with precision by the customer without special tools or experience. The package is not only greatly reduced in size and is much more easily handled but the parts are not subject to the shipping damage which is so common in the transportation of assembled sets. In addition, there are great economies in original manufacture.

According to the present invention the platen in which the leader pin or bushing is to be mounted is provided with a conically tapered socket, the cross section of which enlarges progressively outwardly toward the other platen. By way of example, and not by way of limitation, it is noted that the taper is desirably of the approximate order of three and one-half degrees.

The leader pin or its extension is now provided with a correspondingly tapered end to fit the socket and it is provided with retaining means for subjecting it to axial thrust for holding it seated in the socket. The angle of taper of the socket and the tapered end of the leader pin or its bushing or extension is critical. The angle between the axis and the tapered surface should not be less than three and one-half degrees and desirably should not be more than ten degrees. If the taper is less than three and one-half degrees per side, the leader pin will lock in the platen. If the taper is appreciably greater than approximately the specified maximum, the anchorage of the pin in the platen will not be adequately secure.

As will be explained hereafter, the taper of the leader pin or bushing may be increased slightly toward the wider end thereof to bring about slightly increased compression of the metal of the die shoe as the assembly of the parts is completed.

A die set assembled in the manner described will have its leader pin or bushing part precisely normal to the surface of the platen. It will remain perfectly normal despite repeated disassembly and reassembly and will not require any special equipment for assembly. It will also resist lateral blows or pressures which would completely destroy the accuracy of position of the corresponding part of a conventional die set. Apparently the mounting within the specified angular limits of conical taper permits the mounted base of the said part to tilt momentarily with respect to the platen. Provided the elastic limit of the retaining device is not exceeded, the leader pin or bushing part will restore itself to its original normal position when relieved of the stress.

When the leader pin is set in a sleeve or bushing which holds it in the die shoe (as distinguished from the sleeve or bushing in which it has its sliding bearing), the pin will have a light press fit in the bushing. The fit will tighten up when the bushing is pressed home in the die shoe but the pin will always pull out if subjected to excessive tension somewhat less than that which might damage the die shoe.

Because the pin and/or bushing can be shipped separately from the die shoe and readily assembled thereto in accurate position without skilled labor or special equipment, the invention has important advantages from the standpoint of cost of manufacture and distribution. In addition the invention makes it possible for the die maker to work with a perfectly flat die shoe. Moreover, because of the taper, any errors in drilling the holes to receive the pin or bushing can readily be corrected by boring more deeply into the die shoe on a slightly offset axis. Additional savings are possible in the preferred construction in which the holes in the upper and lower platens are identical, whereby the parts are interchangeable without impairing the accuracy or ease of assembly. The ease with which the parts may be disassembled and reassembled with accuracy is of further importance in maintenance.

The savings in cost of manufacture may amount to one-third or more than one-third. There are additional savings in shipment and in use and still further savings in that the life of a die set embodying the invention is materially prolonged.

In the drawings:

FIG. 1 is a fragmentary detail view of one corner portion of a die set embodying the invention, parts of the platens and the leader pin being fragmentarily illustrated partially in side elevation and partially in section.

FIG. 2 is a fragmentary detail view showing a modified embodiment of the invention.

FIG. 3 is a view on a smaller scale similar to a portion of FIG. 1 and showing a modified retaining means.

FIG. 4 is a view similar to FIG. 3 showing a slightly modified arrangement, the leader pin and die shoe being shown slightly separated.

FIG. 5 is a view similar to FIG. 2 showing a further modified embodiment.

FIG. 6 is a view similar to FIG. 2 showing modified means for mounting the leader pin from the die shoe.

FIG. 7 is a fragmentary detail view similar to FIG. 2 showing a further modified embodiment of the invention.

As already indicated, both the leader pin 10 and the bushing 12 which provides the bearing with which the leader pin coacts are die set parts requiring absolute accuracy of coaxial mounting in a position normal to the lower platen or die carrier 14 and the upper platen or punch carrier 16. Ordinarily the leader pin 10 and bushing 12 are hardened, being much harder than the platens.

As will be apparent from other embodiments herein disclosed, the sockets in the respective platens may be identical and the means of connecting the leader pin to the die shoe may involve a retainer identical with that which holds the bearing bushing to the punch carrier. In FIG. 1 different retaining means are shown, merely to indicate some of the various possibilities in this respect.

In FIG. 1, both the extension base 20 of leader pin 10 and corresponding portion 22 of the bushing 12 are frusto-conically tapered and seated in complementary tapered sockets 24 and 26 in the die carrier 14 and the punch carrier 16 respectively. The angle of taper should be sufficiently great so that the part mounted therein will not seize in the platen but it should not be so great as to preclude rigidity of mounting when the tapered part is anchored in its complementary tapered socket by appropriate retaining means. The angle at which the parts will seize to the platen varies slightly according to materials used but in a die set the angles will normally be within a range of three and one-half to ten degrees from normal.

By way of retaining means, FIG. 1 suggests anchorage of the base portion 20 of leader pin 10 by means of screw 28 threaded into the base portion 20 of the leader pin and having its end engaged with an anchorage disk 30 seated on the shoulder 32 provided by counterbore 34 in the under surface of platen 14. A user receiving a die set in disassembled condition can erect the leader pin in the die carrier platen 14 with ease, requiring no tool other than a screwdriver. Yet he is assured that if the conically tapered base 20 and socket 24 were correctly made in the first place, the erected leader pin 10 will be absolutely normal to the platen 14 and will retain its normal position against stress which would destroy the conventional die set. Apparently, the leader pin, when subjected to lateral pressure at its upper or free end, may be deflected temporarily to a slight degree by reason of the taper. In response to the stress, one side of the base will lift slightly from the socket, this movement being accommodated within the elastic limit of the retaining means which here comprises screw 28 and disk 30. When the stress is relieved, the retaining means reacts resiliently to draw the base back into its original position in the socket, thus restoring the leader pin precisely to its original normal position.

In the case of the bushing part 12, the retaining means comprises a number of screws 38, one of which is illustrated in FIG. 1, the screws being engaged at intervals about the periphery of the bushing with shoulders 40 with which the bushing is provided. Obviously, like retaining means may be used to anchor the base portion 20 of leader pin part 10 if desired. The tapered bushing portion 22 and the tapered socket 26 provided in the punch carrier platen 16 are within the range of angles above specified and the operation is the same. While it is less important in the case of the bearing bushing 12 to provide for this potential deflection (because the bushing has less projection from its platen) nevertheless there are situations in which the bushing is really an extension of a leader pin mounted therein and it is therefore desirable that the bushing have the same type of mounting in its platen as is provided when the leader pin is mounted directly.

FIG. 2 shows a preferred construction in which the bearing bushing 120 has its tapered end 220 engaged in the tapered socket 260 in a manner very similar to that shown in FIG. 1. To anchor it in the punch carrier 16, a shoulder is provided by the peripheral flange 400. At suitable intervals around the bushing, there are toe clamps such as that shown at 440 which bear against the punch carrier 16 and against the flange 400 subject to the clamping pressure of the screw 460 threaded into the punch carrier. Dimensionally the leader pin 100 reciprocates freely through the bushing 120 during normal operation of the die set.

As a means of anchoring the leader pin 100 in the die shoe 14 the bushing 121 is used. This bushing is tapered complementary to the tapered socket 241 in the die shoe 14 and has its upper surface engaged by the toe clamp 441 under clamping pressure exerted by the screw 461. This is an example of the construction already referred to wherein the leader pin 100 is a press fit in the bushing 121 so that, when the bushing is subjected to the axial pressure of the toe clamps 441 around its periphery, and is forced into the tapered socket 241, centripetal pressure upon the leader pin is developed to fix the leader pin securely in the die shoe during normal operation. Yet the leader pin can readily be pulled from the bushing 121 if malfunction causes the leader pin to stick in the bearing bushing 120.

Since the sockets 241 and 260 of the die shoe and the punch carrier may be idential in taper and dimension, construction and repair are facilitated. The arrangement also facilitates production by permitting the use of a leader pin which is uniformly cylindrical from end to end.

The construction shown in FIG. 3 is similar to that shown in FIG. 2 except that the shoulder 45 engaged by the toe clamp 440 is formed directly on the lower end 20 of the leader pin 10.

In any of these constructions I may vary the conical angle of the leader pin or bushing as suggested in FIG. 4 where the leader pin 102 has its tapered lower end portion 202 complementary in angle to the socket 242 for most of the height of the end portion 202. However at the upper end of the base portion 202 there is a slight increase in angle at 203. This is necessarily exaggerated in FIG. 4, being so slight in practice that it would normally be imperceptible in a drawing. When the base portion 203 enters the socket 242 the compression of the metal of the platen is increased. In a sense the leader pin will be anchored more securely but in practice it will yield more readily in response to lateral pressure than is the case with the leader pin of FIG. 2. Under certain conditions this is advantageous.

In the construction shown in FIG. 5 the leader pin 104 has a threaded extremity 48 for which complemetary threads are provided at 50 below the tapered socket 24 in the die shoe. By rotating the leader pin with respect to the die shoe, its tapered lower end portion 204 is forced snugly into the complementary socket 24. In this instance the resulting union of the leader pin and the platen does not permit ready separation without destruction.

In the construction shown in FIG. 6, the leader pin has its lower extremity 20 fitted in the complementary socket of an extension member 52 where it is anchored by a screw 56. The extension member 52 has a tapered extremity 54 held in the socket 24 of the platen 14 by means of a number of bolts such as those indicated at 58. In this instance, the relatively small cross section and inherent elasticity of the bolt 56 which holds the leader pin will permit considerable stretch so that the leader pin can be laterally displaced materially if subjected to excessive stress and yet will resume its original position after the stress is relieved.

In the construction of FIG. 7, the leader pin 101 is entirely cylindrical. It is press fitted into the cylindrical hole of a special mounting bushing 121. Both the leader pin and the bushing are hardened. The bushing 121 has a frusto-conical external surface which fits into the complementary conical surface of the socket 241. At 60 the socket flares outwardly in a downward direction to receive another tapered bushing 62 in which the extreme lower end 64 of bushing 101 is fitted. The screw 281 is threaded into the end portion 64 of leader pin 101 and seats in a washer 66 having a beveled rim complementary to the beveled rim 68 of the conically tapered surface 70 of the bushing 62. When the screw 281 is tightened, it not only draws the leader pin 101 and the bushing 121 pressed therein into the desired upright position, but it firmly seats the bushing 62 in the upwardly tapered portion 60 of the socket in the lower platen 14.

Because of the short length of travel and the fact that the tool has bearing support closer to the work than is possible with conventional methods, relatively light equipment can be used. The shop equipment for making a die set according to the present invention does not cost over two-thirds as much as the equipment to produce a comparable die set by procedures previously used. Moreover, the tapered socket can be completely finished in readiness for use within a matter of minutes as compared with hours previously required to complete such a socket by the conventional reaming and lapping methods. Thus the total cost of production of the socket is reduced by approximately one-half.

Additional savings of substantial amount are effected in reduced shipping costs and in the elimination of damage in shipment. Presently die sets are shipped completely assembled because the ordinary customer does not have facilities for mounting the leader pins and bushings in the platens in the manner heretofore required. Because the present device is shipped disassembled, the package is materially less bulky, the parts are not subjected to damage in packing, and the high proportion of cases in which damages presently are experienced in shipment is eliminated.

There are also advantages in use. Commercial die sets are frequently very heavy and whether the punch carrier is positioned by hand or by crane, the manipulation of the punch carrier to engage the several leader pins is not only difficult but involves relative lateral movement during which there is frequently an engagement of the punch carrier with one or more of the leader pins in a lateral direction and with considerable momentum, whereby there is heavy stress imposed on the leader pin by reason of the considerable masses involved. As above noted, a leader pin or bushing part mounted according to the present invention will yield slightly in response to such lateral stress and regain its original position automatically and with accuracy. In conventional die sets as heretofore made, such stresses have resulted in permanent damage.

In addition, the present invention permits the leader pin to be rotated at intervals during its use, thereby distributing the wear which commonly occurs almost entirely on the face toward the center of the die set. For both reasons, die sets embodying the invention have greatly increased life as compared with previous die sets.

As indicated above, the tapered holes provided in the upper and lower platens may be identical. This permits the punch carrier to be used as a die shoe or vice versa, since the leader pins and/or bushings are interchangeable between the respective platens. It is also advantageous in assembly and inspection to be able to interchange the leader pin and bushing or to shift them temporarily from one platen to the other.

In case the hole in the platen is cylindrical, an error cannot be corrected except by relocating the hole or welding material into the drilled hole and re-boring. Neither means of repair is practical. However, in the event of an error or deformation of any kind in a die set embodying the present invention, the error can be corrected simply by boring the tapered hole slightly more deeply.

From the standpoint of upkeep and replacement, die sets embodying the present invention have advantages in that even the user, who has no special facilities for precision work can withdraw either the leader pin or the bushing, if desired, to leave the entire surface of either platen exposed for machining or for the drilling or tapping of holes used in mounting the punch or the die. It follows that a damaged leader pin or bushing can be replaced with facility and precision without requiring precision tools.

Because of the ease with which they may be assembled and disassembled, the die sets of the present invention are also much safer to use, since the dies and punches can be mounted with the respective platens flat upon a bench and without requiring the use of "parallels." There have been instances in which mis-use of a "parallel" in prior die sets has inflicted serious injury upon the operator.

I claim:

1. A die set comprising the combination of relatively movable metal platens respectively provided with metal leader pin and bushing parts, one of said platens being provided with a socket of frusto-conical form tapered to provide progressive reduction in cross section in a direction away from the other such platen, one of said parts being provided with a plug of fixed frusto-conically tapered form and complementary to the said socket and releasably seated therein, and means for normally maintaining the tapered plug of said one part separably seated in the socket of said one platen, the metal of the tapered plug of said one part being materially harder than the metal of the platen provided with said socket and the taper of the socket and the tapered plug of said one part being in a range of from three and one-half to ten degrees from the axis of the socket, whereby said one part will withdraw its tapered plug from the socket slightly when subjected to lateral deflecting pressure and will resume its position provided such withdrawal does not exceed the elastic limit of said retaining means, said retaining means having sufficient elasticity to accommodate the said slight withdrawal.

2. A die set according to claim 1 in which the platen provided with the socket has a shoulder beyond the socket, the retaining means including a screw with threads operatively connected with the said one part and means held by said threads in engagement with said shoulder.

3. A die set according to claim 1 in which the tapered plug of said one part constitutes an integral extension of said part and provides a shoulder spaced above the surface of the platen having the socket in which said plug portion is positioned, said retaining means including a toe clamp engaged with said last mentioned platen and having an offset end engaged with the shoulder, and a screw in connection with the platen provided with a socket.

4. A die set according to claim 1 in which the tapered plug of said one part comprises an integral enlargement of said part having a shoulder beyond which said part projects, the retaining means comprising means engaged with the platen provided with the socket and also engaged with said shoulder and having a screw connecting it to the platen provided with the socket and tightened to exert clamping pressure upon said shoulder in a direction to press the plug portion into the socket.

5. A die set according to claim 1 in which said one part comprises a leader pin having an extension constituting a bushing on which is disposed said frusto-conically tapered plug engaged in said socket, the leader pin being frictionally fixed within the bushing extension thereof and the retaining means constituting means for drawing the bushing into the socket.

6. In a die set having relatively reciprocable platens, the combination of one such platen provided with a frusto-conically tapered socket and made of relatively soft material, and a leader pin normal to the platen and having a frusto-conically tapered one-piece terminal plug of relative hard material and of fixed dimensions and complementary to the socket and engaged therein, the socket and the leader pin treminal plug being of circular cross section and so tapered as to be progressively reduced in radius in a direction away from the leader pin, and elastically yieldable retaining means for releasably maintaining the terminal plug of the leader pin in the socket, the taper of said terminal plug being witihin limits of three and one-half to ten degrees to constitute means for permitting substantial lateral deflection of the leader pin respecting the platen within the elastic limit of the retaining means and with subsequent restoration to normal.

7. In a die set having relatively reciprocable platens, the combination of one such platen having a tapered socket and a tubular bushing of complementary external taper disposed in the socket and having a cylindrical bore, a leader pin having a cylindrical press fit in the portion disposed with said bore of the bushing, said bushing having uninterrupted axial continuity, and means operatively connected between the platen and the bushing for drawing the bushing into the tapered socket and thereby compressing the solid bushing upon the leader pin and developing clamping pressure of the bushing upon the leader pin in said bore.

8. A die set according to claim 7 in which the external surface of the bushing has a portion whose angle of external taper increases at its larger end and the socket has a complementary portion in which said bushing portion is engaged.

(References on following page)

References Cited by the Examiner

UNITED STATES PATENTS

| | | | |
|---|---|---|---|
| 172,689 | 1/1876 | Barrett | 287—52.06 X |
| 257,353 | 5/1882 | Lucas | 308—4 |
| 353,189 | 11/1886 | White | 113—49 |
| 2,013,488 | 9/1935 | Carrier | 287—20.3 |
| 2,051,998 | 8/1936 | Monroe. | |
| 2,175,705 | 10/1939 | Scott | 308—4 |
| 2,218,195 | 10/1940 | Garrett | 22—110 |
| 2,288,136 | 6/1942 | Janiszewski | 308—5 |
| 2,356,387 | 8/1944 | Danneman | 308—4 X |
| 2,445,574 | 7/1948 | Grunow | 308—4 |
| 2,714,422 | 8/1955 | Janiszewski | 308—4 |
| 2,751,260 | 6/1956 | Janiszewski | 308—4 |
| 2,756,825 | 7/1956 | Janiszewski | 308—4 |
| 2,906,563 | 9/1959 | Conner. | |
| 3,156,418 | 11/1964 | Jablonski | 287—52.06 X |

FOREIGN PATENTS

| | | |
|---|---|---|
| 1,066,946 | 6/1954 | France. |
| 1,123,117 | 9/1956 | France. |

DAVID J. WILLIAMOWSKY, *Primary Examiner.*

CHARLES W. LANHAM, DON A. WAITE, *Examiners.*

R. J. HERBST, L. L. JOHNSON, *Assistant Examiners.*